United States Patent
Kemp

[15] 3,678,099
[45] July 18, 1972

[54] PROCESS FOR THE ESTERIFICATION OF ISOBUTENE

[72] Inventor: Jacob D. Kemp, El Cerrito, Calif.

[73] Assignee: Chevron Research Company, San Francisco, Calif.

[22] Filed: June 26, 1970

[21] Appl. No.: 50,291

[52] U.S. Cl. ....................................................... 260/497 R
[51] Int. Cl. ........................................................ C07c 67/04
[58] Field of Search ............................................ 200/497 R

[56] References Cited

UNITED STATES PATENTS

| | | | |
|---|---|---|---|
| 3,026,362 | 3/1962 | McKeever | 260/497 R X |
| 3,031,495 | 4/1962 | Young et al. | 260/497 R |
| 3,037,052 | 5/1962 | Bortnick | 260/497 R X |
| 3,053,887 | 9/1962 | Aries | 260/497 R |
| 3,578,609 | 5/1971 | Haag et al. | 260/497 A |

*Primary Examiner*—Lorraine A. Weinberger
*Assistant Examiner*—Richard D. Kelly
*Attorney*—A. L. Snow, F. E. Johnston, G. F. Magdeburger, C. J. Tonkin and T. G. De Jonghe

[57] ABSTRACT

A process for the esterification of isobutene with reduced polymerization of the isobutene which comprises contacting the isobutene with a lower carboxylic acid and an acidic resin catalyst containing a sulfonate group, which catalyst has between about 0.2 and 2.4 meq. of H+ per gram of catalyst. Preferred carboxylic acids include formic acid and acetic acid and the preferred type catalyst is a resinous sulfonated polystyrene divinyl benzene copolymer.

7 Claims, No Drawings

PROCESS FOR THE ESTERIFICATION OF ISOBUTENE

BACKGROUND OF THE INVENTION

This invention relates to the esterification of olefins. More specifically, the present invention relates to the esterification of isobutene with carboxylic acids.

The reaction of various carboxylic acids with "tertiary" olefins is well known. Using, for example, acetic acid and isobutylene, the reaction can be represented as follows:

Such ester is useful as a paint solvent and as a grease component. In addition, it is a valuable additive for improving the octane rating of lead free or low lead (less than 1 cc. lead additive per gal. of gasoline) gasoline. As a group these esters are solvents for many organic materials and, therefore, are useful as vehicles therefor.

The condensing of a tertiary olefinic compound with a carboxylic acid is usually done in the presence of a catalyst. Some of the catalysts employed in the past were sulfuric acid, complexes of boron trifluoride, orthophosphoric acid suitably supported on an inert support such as kieselguhr, benzenesulfonic acid, alkyl sulfates, or other strong mineral or organic acids. Such catalysts are normally present as a distinct liquid phase in the esterification reaction mixture, or are homogeneous therewith, or are sorbed on a solid porous carrier such as silica, charcoal or alumina.

According to U.S. Pat. No. 2,678,332, the use of a solid acid acting resin as an esterification catalyst is disclosed. As indicated in U.S. Pat. No. 2,678,332, the use of acid solid catalysts offers several advantages over the use of homogeneous acid catalysts.

In using the acidic solid catalysts, particularly the acidic resin catalysts, to catalyze the esterification of isobutene with organic acids, the yield of ester has been somewhat decreased and the purity of the product has been decreased due to the polymerization of the isobutene during the acid catalyzed esterification reaction. Various methods have been disclosed to suppress the isobutene polymerization. For example, in U.S. Pat. No. 3,031,495, a process is disclosed for the preparation of tertiary alkyl acetate while substantially limiting polymer byproduct formation by contacting the organic acid with the tertiary olefin in the presence of controlled amounts of catalyst, preferably less than about 10 weight percent of the acid catalyst based on the weight percent organic acid fed to the esterification reaction zone. According to U.S. Pat. No. 3,082,246, polymerization during the esterification of isobutene is suppressed by carrying out the esterification reaction at elevated pressure in the presence of sulfur dioxide. According to U.S. Pat. No. 3,172,905, an alpha-sulfo stearic acid catalyst is used in the esterification reaction because it discourages the undesirable polymerization of isobutene. According to U.S. Pat. No. 3,173,943, a mono basic fatty acid having 1-3 halogen atoms on the alpha carbon is used to catalyze the esterification reaction on the basis that the halogen containing catalyst discourages the serious competing reaction of polymerization of the tertiary olefin reactant.

The above indicated methods of controlling the polymerization of isobutene during acid catalyzed esterification have met with only limited success. Polymerization of the relatively highly reactive isobutene has continued to be a considerable problem, especially when using resin catalysts such as disclosed in U.S. Pat. No. 2,678,332, and particularly when using sulfonated resin catalysts as disclosed in U.S. Pat. No. 3,053,887.

SUMMARY OF THE INVENTION

According to the present invention, a process is provided for the esterification of isobutene with reduced polymerization of the isobutene which comprises contacting the isobutene with a lower carboxylic acid and an acidic resin catalyst containing a sulfonate group, which catalyst has between about 0.2 and 2.4 milliequivalents (meq.) of H+ per gram of catalyst.

The milliequivalents of H+ per gram of catalyst can be determined, for example, by titrating to neutrality a given weight amount of the catalyst with a base, such as sodium hydroxide. The millimoles of the hydroxide used in the titration is equal to the milliequivalents of H+ in the catalyst sample titrated.

The term "lower carboxylic acid" is used in the present specification to include carboxylic acids having from 1–7 carbon atoms. Particularly preferred carboxylic acids for reaction with isobutene in accordance with the present invention are formic and acetic acids.

The isobutene feed for reaction with the carboxylic acid in the process of the present invention preferably is a relatively pure isobutylene feedstream such as 95 weight percent or higher purity isobutene. However, the isobutene can be mixed with other hydrocarbons. In accordance with one preferred alternate embodiment of the present invention, the isobutene is present in a $C_4$ and/or $C_5$ cut from a catalytic or thermal cracking operation.

The present invention is based largely on our discovery that the specificity of esterification of isobutene with carboxylic acids such as acetic acid and formic acid can be increased by reducing the acidity of sulfonated resin catalysts from their normal range of about 4.0 to 5.0 meq. H+ per gram of catalyst to between 0.35 and 2.4 meq. H+ per gram of catalyst before carrying out the isobutene esterification reaction. The preferred sulfonate resin catalysts which are used in the process of the present invention are catalysts such as the sulfonated polystyrene divinyl benzene resin catalysts disclosed in U.S. Pat. No. 3,053,887. However, after acidifying and washing the sulfonated resin catalyst as indicated, for example, in the second paragraph of column 3 of U.S. Pat. No. 3,053,887, the process of the present invention then requires that the acidity of the catalyst be reduced to below 2.4 meq. per gram of catalyst before using the catalyst in the esterification reaction of the present invention. If the acidity of the catalyst is not reduced, the acidity of the catalyst will be between about 4 and 5 meq. H+ per gram of catalyst after the resin catalyst is put in the acid form and then washed with extensive amounts of demineralized water to remove excess amounts of the acid used for acidification as explained in U.S. Pat. No. 3,053,887.

The acidity of the sulfonated resin catalyst can be reduced by exchanging the acidic hydrogen of the sulfonated resin catalyst with a metallic ion such as sodium. For example, the acidity of the sulfonated resin catalyst can be reduced by exchanging the acidic hydrogen form of the catalyst with a sodium chloride solution.

We have found that when esterifying isobutene with formic acid, preferred acidity for the sulfonated resin catalyst is between about 0.2 and 2.0 meq. H+ per gram of catalyst. Preferred reaction temperatures used in conjunction with the 0.2 to 2.0 acidity for obtaining substantial yields of the t-butyl formate, while nearly completely avoiding the formation of any polymer of isobutene, are between about 50° and 150°F.

We have found that preferred reaction conditions for esterification of acetic acid with isobutene include a catalyst acidity between 0.5 and 2.4 meq. H+ and a temperature between 100°–200°F. It can be noted from the above that we have found that the preferred meq. H+ for the sulfonate resin catalyst when esterifying acetic acid with isobutene is greater than in the case of formic acid esterification. We have also found that when esterifying acetic acid with isobutene at temperatures between about 150° and 200°F., it is particularly preferable to maintain the sulfonate resin catalyst acidity between about 0.5 and 1.0 meq. H+ per gram of catalyst in order to maintain relatively low polymer formation while obtaining substantial yields of tertiary butyl acetate. In accordance with our experimental findings, we have further found that particularly preferred acidity levels for the sulfonated resin catalyst when carrying out the esterification of isobutene with acetic acid at a temperature between about 100° and 150°F. are about 1.0 to 2.4 meq. H+ per gram of catalyst.

Suitable catalysts for use in the process of the present invention include relatively high molecular weight water insoluble carbonaceous materials containing sulfonate groups in the form of —$SO_3H$ or —$SO_3Na$. These catalysts are exemplified by the sulfonated coals (Zeo-Karb H, Nalcite X, and Nalcite AX) produced by the treatment of bituminous coals with sulfuric acid and commercially marketed as zeolitic water softeners or base exchangers.

Also suitable are the sulfonated resin type catalysts which include the reaction products of phenolformaldehyde resins with sulfuric acid (Amberlite IR-1, Amberlite IR-100, and Nalcite MX). Also useful are the sulfonated resinous polymers of coumarone indene with cyclopentadiene, sulfonated polymers of coumarone indene with furfural, sulfonated polymers of coumarone indene with cyclopentadiene and furfural and sulfonated polymers of cyclopentadiene with furfural. The most preferred cationic exchange resins are exchange resins consisting essentially of sulfonated polystyrene resin, for instance, a divinyl-benzene cross-linked polystyrene matrix having about 0.5 to 20 percent, preferably about 4 to 16 percent, of copolymerized divinylbenzene therein to which are attached ionizeable or functional nuclear sulfonate groups. These resins are manufactured and sold commercially under various trade names; e.g., Dowex 50, Nalcite HCR, and Amberlyst 15.

The resin particle size is chosen with a view of the manipulative advantages associated with any particular range of sizes. Although a small size (200–400 mesh) is frequently employed in autoclave runs, a mesh size of 10–50 or coarser seems more favorable for use in fixed bed or slurry reactors.

Thus, according to a preferred embodiment of the present invention, the catalyst comprises a resin containing a sulfonate group. According to a particularly preferred embodiment of the present invention, the catalyst comprises a divinyl benzene cross-linked polystyrene matrix, having about 0.5 to 20 percent of copolymerized divinylbenzene by weight of the catalyst to which is attached sulfonate groups, and having a macroreticular structure.

The term "macroreticular" is used herein to connote a resin catalyst pore structure having a high degree of true porosity, that is, pores which are rigid and fixed within the resin beads. The high porosity gives rise to a large surface area which is conducive to high catalytic activity. Amberlyst 15 is a particularly preferred divinylbenzene catalyst for use in the process of the present invention. The macroreticular structure in Amberlyst 15 permits ready access of reactants to the sulfonate groups or ions present throughout the resin catalyst beads. This accessibility is not generally found in conventional ion-exchange resins.

In the process of the present invention, preferably the reaction of the isobutene with the lower carboxylic acid is carried out by passing the two reactants through a bed of the sulfonate resin catalyst particles at a liquid hourly space velocity (LHSV) between about 0.1 and 10.0 and preferably between about 0.4 and 2.5.

EXAMPLES

1. Formic acid and isobutene were contacted in the presence of a sulfonate resin catalyst under the conditions as summarized in table I below. As can be seen from the table, at a temperature of 100°F. using the preferred Amberlyst 15 catalyst with its normal acid form acidity of about 4.9 meq. H+ per gram of catalyst, only a very low yield of ester was formed, specifically only 8.2 percent t-butyl formate, whereas a very high yield of the undesired polymer was formed, specifically 90 weight percent diisobutylene. After sodium exchanging the sulfonate resin catalyst, the results as indicated in column 2 of table I were obtained. Contrasted to only 8.2 percent t-butyl formate yield when using the non-sodium exchanged acidified sulfonate resin catalyst, 71.2 percent t-butyl formate was formed when the acidity of the catalyst was reduced to a level as required by the process of the present invention. The amount of polymer produced by the sodium exchanged sulfonate resin catalyst was reduced from 90 percent with the nonsodium exchanged catalyst to less than 1/10th weight percent polymer with the 0.35 meq. H+ catalyst.

TABLE I

Esterification of Formic Acid and Isobutene

| Catalyst | Sulfonate Resin | ResinNa Exchanged Sulfonate Resin | |
|---|---|---|---|
| Acidity, MEQ. H+/g. | 4.9 | 0.35 | |
| Temp., °F. | 100 | 100 | 100 |
| Pressure, PSIG | 250 | 275 | 275 |
| Formic Acid LHSV[1] | 1.13 | 0.81 | 1.05 |
| Isobutene LHSV | 1.93 | 1.37 | 1.45 |
| Product, Wt. % | 2 Phases | 1 Phase | 1 Phase |
| | HC   Acid | | |
| Formic Acid | —    94.9 | 21.7 | 25.2 |
| $H_2O$ | —    2.5 | 0.9 | 0.8 |
| t-Butyl Alcohol | —    — | 0.7 | 0.8 |
| t-Butyl Formate | 8.2    2.7 | 71.2 | 68.4 |
| Isobutene | 1.8    — | 5.4 | 4.8 |
| Diisobutylene | 90.0    — | — | — |
| % Isobutene Converted to | | | |
| t-Butyl Formate | 6 | 88 | 89 |
| Polymer | 92 | 0 | 0 |

[1] Water in formic acid feed = 2.4 weight percent.

2. Acetic acid and isobutene were contacted in the presence of a sulfonate resin catalyst under the conditions as tabulated in table II below. As can be seen from the data tabulated in table II below, an acidity of about 0.35 meq. H+ per gram of catalyst was desirable from the standpoint of avoiding polymer formation during the esterification reaction. However, unlike the case with formic acid, the yield of ester was not very substantial at the relatively low acidity level of 0.35 meq. H+ per gram of catalyst. When using sulfonate resin catalyst having an acidity of 0.6 meq. H+ per gram of catalyst as opposed to the lower level of 0.35, the yields of ester from the acetic acid were substantial while still nearly completely avoiding the formation of polymer. Specifically, at a reaction temperature of about 150°F. using the 0.6 meq. H+ catalyst, a product of about 25 weight percent t-butyl acetate was obtained with essentially no formation of polymer whereas at the same temperature, only 5.1 weight percent t-butyl acetate was formed when using the 0.35 meq. H+ catalyst.

It can also be seen from the results tabulated in table II below that at a catalyst acidity between about 0.5 and 1.0 as, for example, at a catalyst acidity of about 0.6 meq. H+, substantially increased yields of t-butyl acetate can be obtained at temperatures between 150–200°F. as opposed to temperatures below 150°F. Also, it is of primary importance that at the temperatures in the range of 150–200°F., with a relatively low acidity, specifically between about 0.5 and 1.0 meq. H+, the production of polymers was substantially avoided while producing the desired t-butyl acetate.

TABLE II

Esterification of Isobutene and Acetic Acid

| Catalyst | Sulfonated Resin | | | | | |
|---|---|---|---|---|---|---|
| Acidity, meq. H+/g. | 0.35 | 0.35 | 0.6 | 0.6 | 0.6 | 0.6 |
| Temp., °F. | 125 | 150 | 125 | 150 | 175 | 200 |
| Pressure, PSIG | 500 | 500 | 500 | 500 | 500 | 500 |
| Isobutene LHSV | 1.05 | 1.05 | 0.94 | 1.00 | 0.97 | 0.97 |
| Acetic Acid LHSV | 0.53 | 0.48 | 0.52 | 0.57 | 0.42 | 0.42 |
| Mole Ratio, i-$C_4C_6$/ | | | | | | |

| | | | | | | |
|---|---|---|---|---|---|---|
| CH$_3$COOH | 1.20 | 1.33 | 0.95 | 0.94 | 1.14 | 1.05 |
| Product Composition, Wt. % | | | | | | |
| Izobutene | 51.3 | 52.4 | 43.2 | 34.6 | 33.0 | 32.2 |
| Acetic Acid | 46.9 | 42.5 | 49.0 | 40.4 | 28.6 | 32.6 |
| t-Butyl Acetate | 1.8 | 5.1 | 7.8 | 25.0 | 38.4 | 34.4 |
| Polymer | — | — | — | — | — | 0.8 |
| % Acetic Acid Converted to Ester | 1.9 | 5.8 | 7.6 | 24.3 | 41 | 35.3 |
| % Isobutene Converted to Ester | 1.6 | 4.5 | 8.0 | 25.9 | 36 | 33.5 |

3. In another set of runs, acetic acid was contacted with isobutene in the presence of a slightly higher acid content sulfonate resin catalyst compared to the acidity of the sulfonate resin catalyst used to obtain the data reported in table II above. It can be seen from the data summarized in table III below that as the acidity of the sulfonated resin catalyst goes up from about 1.1–2.4 meq. H+, the amount of polymer formed tends to increase. At an acidity of about 2.4 meq. H+ per gram of catalyst and a temperature of about 125° or 150° F. or higher, the rate of production of polymers in the esterification of acetic acid with isobutene begins to become excessive. For example, at a temperature of 125°F. with a 2.4 meq. H+ catalyst, the amount of polymer formed was about 6.8 weight percent of the product. However, at the same temperature but a reduced acidity of about 1.1 meq. H+ per gram of catalyst, the amount of polymer produced was less than 0.1 weight percent. Contrasting the data reported in table III to that reported in table II shows that somewhat greater yields of the desired ester can be produced in the reaction of acetic acid with isobutene by maintaining the acidity between about 1.1 and 2.4 meq. H+ versus the lower acidity of about 0.5–1.0 if the temperatures used with the higher acidity are also reduced to about 100°–150°F. versus the higher 150°–200°F. temperatures preferably used with the 0.5–1.0 meq. H+ acidity.

TABLE III

Esterification of Isobutene and Acetic Acid, Higher Acidity

| Catalyst | Na Exchanged Sulfonated Resin | | | Na Exchanged Sulfonated Resin | | | | |
|---|---|---|---|---|---|---|---|---|
| Acidity, meq. H+/g. | 1.1 | | | 2.4 | | | | |
| Temp., °F. | 125 | 125 | 150 | 150 | 100 | 100 | 100 | 125 |
| Pressure, PSIG | 500 | 500 | 500 | 500 | 500 | 500 | 500 | 500 |
| Isobutene LHSV | 0.65 | 0.76 | 1.05 | 0.97 | 0.96 | 0.75 | 1.09 | 1.14 |
| Acetic Acid LHSV | 0.29 | 0.40 | 0.40 | 0.52 | 0.34 | 0.25 | 0.34 | 0.51 |
| Mole Ratio, i-C$_4$H$_8$/CH$_3$COOH | 1.61 | 1.21 | 1.39 | 1.10 | 1.58 | 1.85 | 1.73 | 1.31 |
| Product Composition, Wt. % | | | | | | | | |
| Isobutene | 34.1 | 29.5 | 31.8 | 25.7 | 31.1 | 34.6 | 35.7 | 23.8 |
| Acetic Acid | 13.8 | 21.7 | 19.3 | 24.1 | 12.6 | 8.6 | 8.9 | 19.1 |
| t-Butyl Acetate | 50.4 | 48.3 | 46.6 | 48.2 | 53.8 | 54.4 | 53.7 | 49.8 |
| t-Butyl Alcohol | 1.4 | 0.3 | 0.7 | 1.2 | — | — | — | 0.6 |
| Polymer | — | — | 1.5 | 0.6 | 2.5 | 2.4 | 1.7 | 6.8 |
| H$_2$O | 0.3 | 0.1 | 0.1 | 0.2 | | | | |
| Acetic Acid Converted | 67 | 53.4 | 55.5 | 49.1 | 69.1 | 76.6 | 75.7 | 57.4 |
| % Isobutene Converted to | | | | | | | | |
| Ester | 40.5 | 43.9 | 39.9 | 46.2 | 43.7 | 38.4 | 40.9 | 43.6 |
| Polymer | — | — | 2.7 | 1.1 | 4.2 | 3.8 | 2.7 | 12.3 |
| t-Butyl Alcohol | 1.8 | 0.4 | 0.9 | 1.8 | — | — | — | 1.0 |

The pressures used in the above example sets 1–3 ranged from 250–500 psig. Other superatmospheric pressures are satisfactory in the process of the present invention, but it is preferred that the pressure be sufficiently high so that under the prevailing reaction conditions, i.e., composition of the reactants and temperature, the reaction will be carried out substantially in the liquid phase.

The particular catalyst used to obtain the data tabulated in tables I, II and III was Amberlyst 15, which is a divinylbenzene cross-linked polystyrene matrix, having between 0.5–20 percent of copolymerized divinylbenzene by weight of the resin catalyst to which is attached sulfonate groups, and having a macroreticular structure. More specifically, Amberlyst 15 has the following properties:

| Property | Amberlyst 15 |
|---|---|
| Appearance | Hard, spherical, dark-brown particles, toluene-saturated |
| Typical particle size distribution, percent retained on: | |
| 16 mesh U.S. Standard Screens | 2.4 |
| −16 + 20 mesh U.S. Standard Screens | 24.2 |
| −20 + 30 mesh U.S. Standard Screens | 47.9 |
| −30 + 40 mesh U.S. Standard Screens | 18.8 |
| −40 + 50 mesh U.S. Standard Screens | 5.7 |
| Through 50 mesh, percent | 1.0 max. |
| Whole bead content, % | 100 |
| Bulk density, g/l as supplied | 850 |
| lbs./cu. ft. | 54 |
| True density, g/ml as supplied | 1.4 |
| Moisture, % by weight | less than 1% |
| Solids, % | 55–60 |
| Percentage swelling from dry state to solvent-saturated state— | |
| hexane | 12 |
| toluene | 15 |
| toluene | 17 |
| ethyl acetate | 35 |
| ethyl alcohol (95%) | 66 |
| water | 66 |
| Hydrogen ion concentration meq./g. dry | 4.9 |
| Surface Area, m²/g. | 40–50 |
| Porosity, ml. pore/ml. bead | 0.30–.35 |
| Average Pore Diameter, A | 200–600 |

As can be seen from the properties given above, the acid form of Amberlyst 15 is generally obtained with a hydrogen ion concentration (—SO$_3$H concentration) of about 4.9 meq. per gram of catalyst. Thus, for use of the Amberlyst 15 catalyst in the process of the present invention, the acid form of Amberlyst 15 catalyst must first be ion-exchanged to reduce the acidity.

Amberlyst 15 is further described in Bulletin IE-64-62, February 1962, titled "Amberlyst 15 Synthetic Resin Catalyst Technical Notes," and published by the Rohm and Hass Company.

Although various specific embodiments of the invention have been described and shown, it is to be understood that they are meant to be illustrative only and not limiting. Certain features may be changed without departing from the spirit or essence of the invention. It is apparent that the present invention has broad application to the esterification of isobutene using a catalyst containing a sulfonate group. Accordingly, the invention is not to be construed as limited to the specific embodiments illustrated, but only as defined in the appended claims.

I claim:

1. A process for the esterification of isobutene with reduced polymerization of the isobutene which comprises contacting the isobutene with a lower carboxylic acid and a sulfonated acidic resin catalyst, which catalyst has between about 0.2 and 2.4 meq. of H+ per gram of catalyst.

2. A process for the esterification of isobutene with reduced polymerization of the isobutene which comprises contacting, at a temperature between about 50° and 150°F., the isobutene with formic acid and a sulfonated acidic resinous catalyst, which catalyst has between 0.2 and 2.0 meq. of H+ per gram of catalyst.

3. A process for the esterification of isobutene with reduced polymerization of the isobutene which comprises contacting, at a temperature between about 100° and 200°F., the isobutene with acetic acid and a sulfonated acidic resinous catalyst, which catalyst has between 0.5 and 2.4 meq. of H+ per gram of catalyst.

4. A process in accordance with claim 3 wherein the acidity of the catalyst is between 0.5 and 1.0 meq. H+ per gram of catalyst and the esterification reaction is carried out at a temperature between 150° and 200°F.

5. A process in accordance with claim 3 wherein the acidity of the catalyst is between 1.0 and 2.4 meq. H+ per gram of catalyst and the esterification reaction is carried out at a temperature between 100° and 150°F.

6. A process in accordance with claim 1 wherein the catalyst comprises a sulfonated divinylbenzene cross-linked polystyrene matrix, having about 0.5 to 20 percent of copolymerized divinylbenzene by weight of said catalyst, and said catalyst having a macroreticular structure.

7. A process in accordance with claim 3 wherein the catalyst comprises a sulfonated divinylbenzene cross-linked polystyrene matrix, having about 0.5 to 20 percent of copolymerized divinylbenzene by weight of said catalyst, and said catalyst having a macroreticular structure.

* * * * *